United States Patent
Leuschner et al.

(10) Patent No.: US 11,961,541 B2
(45) Date of Patent: Apr. 16, 2024

(54) SYSTEM AND METHOD FOR WRITING DATA TO TAPE AND READING DATA FROM TAPE USING A RESTFUL INTERFACE

(71) Applicant: QUANTUM CORPORATION, San Jose, CA (US)

(72) Inventors: Jeff Leuschner, Wylie, TX (US); Doug Burling, Plano, TX (US); YingPing Lu, Markham (CA)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 18/107,246

(22) Filed: Feb. 8, 2023

(65) Prior Publication Data
US 2023/0267951 A1 Aug. 24, 2023

Related U.S. Application Data

(60) Provisional application No. 63/313,668, filed on Feb. 24, 2022.

(51) Int. Cl.
*G11B 5/008* (2006.01)
(52) U.S. Cl.
CPC .................. *G11B 5/00813* (2013.01)
(58) Field of Classification Search
None
See application file for complete search history.

(56) References Cited

U.S. PATENT DOCUMENTS

| | | | | |
|---|---|---|---|---|
| 10,482,922 | B1* | 11/2019 | Franklin | G11B 5/00817 |
| 2005/0049849 | A1* | 3/2005 | Re | G06F 3/0664 |
| | | | | 703/26 |
| 2016/0094390 | A1* | 3/2016 | Sirianni | G06F 16/1824 |
| | | | | 709/221 |
| 2018/0322136 | A1* | 11/2018 | Carpentier | G06F 16/188 |
| 2018/0324217 | A1* | 11/2018 | Xie | H04L 63/20 |
| 2020/0159430 | A1* | 5/2020 | Ikeda | G06F 3/0635 |
| 2020/0257452 | A1* | 8/2020 | Oh | G06F 3/0647 |
| 2023/0267951 | A1* | 8/2023 | Leuschner | G11B 5/00813 |
| | | | | 360/55 |

* cited by examiner

*Primary Examiner* — Peter Vincent Agustin
(74) *Attorney, Agent, or Firm* — James P. Broder; Devin Vaage; Anne-Marie Dinius

(57) ABSTRACT

A system (200) for at least one of writing data to tape media (204) and reading data from the tape media (204) includes a client application (202); and a RESTful interface (212) through which the client application (202) transmits a request to at least one of write data to the tape media (204) and read data from the tape media (204) to a REST daemon (214), the RESTful interface (212) being integrated with a SCSI interface (210). The REST daemon (214) subsequently passes the request on to a data mover (208), which opens a second RESTful interface (220) with the client application (202). The client application (202) then sends the request to the data mover (208) via the second RESTful interface (220). The data mover (208) then performs the request by moving the data between the client application (202) and the tape media (204), with the data never landing on primary storage during such movement.

19 Claims, 2 Drawing Sheets

SYSTEM AND METHOD FOR WRITING DATA TO TAPE AND READING DATA FROM TAPE USING A RESTFUL INTERFACE

RELATED APPLICATION

This application claims priority on U.S. Provisional Application Ser. No. 63/313,668, filed on Feb. 24, 2022. As far as permitted, the contents of U.S. Provisional Application Ser. No. 63/313,668 are incorporated in their entirety herein by reference.

BACKGROUND

Small Computer System Interface (SCSI) is available in a variety of functional interfaces and incorporates a set of standards for physically connecting and transferring data between computers and peripheral devices. The SCSI standards define various commands and protocols, as well as enabling certain electrical, optical and logical interfaces. For example, the SCSI standards can define command sets for specific peripheral device types. The presence of "unknown" as one of these device types means that in theory it can be used as an interface to almost any device, but the standard is highly pragmatic and addressed toward commercial requirements. Many other interfaces, which do not rely on complete SCSI standards, still implement the SCSI command protocol. Still other interfaces drop physical implementation entirely, while retaining the SCSI architectural model.

FIG. 1 is a simplified flowchart illustrating a typical prior art system 100P (also sometimes referred to as a "SCSI system") where a client application 102 writes data to tape media 104 and reads data from tape media 104 going directly through a filesystem 106 and a data mover 108 using a SCSI interface 110. As illustrated, in a traditional usage of the prior art system 100P, the client application 102 performs input/output (I/O) operations directly to disk, such as transmitting requests for writing data to and/or reading data from a disk-based filesystem 106. The filesystem 106 then transmits the requests for writing and/or reading the data to the data mover 108. The data mover 108 then utilizes a tape drive (not shown) to write data to and/or read data from the filesystem 106, and uses a SCSI interface 110 to perform I/O operations to the tape media 104.

As such, efforts for current users to write data to or read data from tape media typically entail the direct use of a SCSI interface. Unfortunately, use of a SCSI interface and/or the standards, protocols and architecture incorporated therein can be very complex. Stated in another manner, current technology typically involves writing complex code to mount up, position, and read from and write to tape using SCSI interfaces. There is a lot of logic to have to mount a tape, position the tape, etc. for writing to or reading from tape. All of this logic involves quite a bit of SCSI logic.

However, there are applications that want to write data to a tape or read data from a tape, but do not want to have to understand the typical SCSI interface and all that goes with it. Stated in another manner, existing applications do not want to have to write all of the complex code to write to and read from tape media. Thus, it is desired to make writing data to or reading data from tape much easier from the user perspective.

SUMMARY

The present invention is directed toward a system for at least one of writing data to tape media and reading data from the tape media. In various embodiments, the system includes a client application; and a RESTful interface through which the client application transmits a request to at least one of write data to the tape media and read data from the tape media to a REST daemon.

In some embodiments, the client application initiates a first request to write data to the tape media via a REST call to the REST daemon via the RESTful interface; and the client application initiates a second request to read data from the tape media via a REST call to the REST daemon via the RESTful interface.

In many embodiments, the REST daemon subsequently passes the request on to a data mover.

In some embodiments, the REST daemon passes the request on to the data mover via an internal interface.

In certain embodiments, at least one of the REST daemon and the data mover are included as part of a storage management system.

In some embodiments, each of the REST daemon and the data mover are included as part of a storage management system.

In many embodiments, the data mover subsequently opens an interface with the client application.

In various embodiments, the client application then sends the request to at least one of write data to the tape media and read data from the tape media to the data mover via the interface between the data mover and the client application.

In some embodiments, for a first request to write data to the tape media, the data mover reads the data from the client application, and then writes the data to the tape media via a SCSI interface; and for a second request to read data from the tape media, the data mover reads the data from the tape media via a SCSI interface, and then sends the data to the client application.

In certain embodiments, the interface between the data mover and the client application is a second RESTful interface.

In many embodiments, the data that is at least one of written to the tape media and read from the tape media never lands on primary storage during movement between the client application and the tape media.

In various embodiments, the RESTful interface is integrated with a SCSI interface.

The present invention is further directed toward a method for at least one of writing data to tape media and reading data from the tape media, the method including the step of transmitting a request to at least one of write data to the tape media and read data from the tape media from a client application to a REST daemon via a RESTful interface.

The present invention is also directed toward A system for at least one of writing data to tape media and reading data from the tape media, including a client application; and a RESTful interface through which the client application transmits requests to write data to the tape media and read data from the tape media to a REST daemon; wherein the client application initiates a first request to write data to the tape media via a REST call to the REST daemon via the RESTful interface; wherein the client application initiates a second request to read data from the tape media via a REST call to the REST daemon via the RESTful interface; wherein the REST daemon subsequently passes the request on to a data mover via an internal interface; wherein the data mover subsequently opens a second RESTful interface with the client application; wherein the client application then sends the requests to write data to the tape media and read data from the tape media to the data mover via the second RESTful interface between the data mover and the client application; wherein for the first request to write data to the tape media, the data mover reads the data from the client application, and then writes the data to the tape media via a SCSI interface; wherein for the second request to read data from the tape media, the data mover reads the data from the tape media via the SCSI interface, and then sends the data to the client application; wherein the data that is written to the tape media and read from the tape media never lands on primary storage during movement between the client application and the tape media; and wherein the RESTful interface is integrated with a SCSI interface.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figure 1:
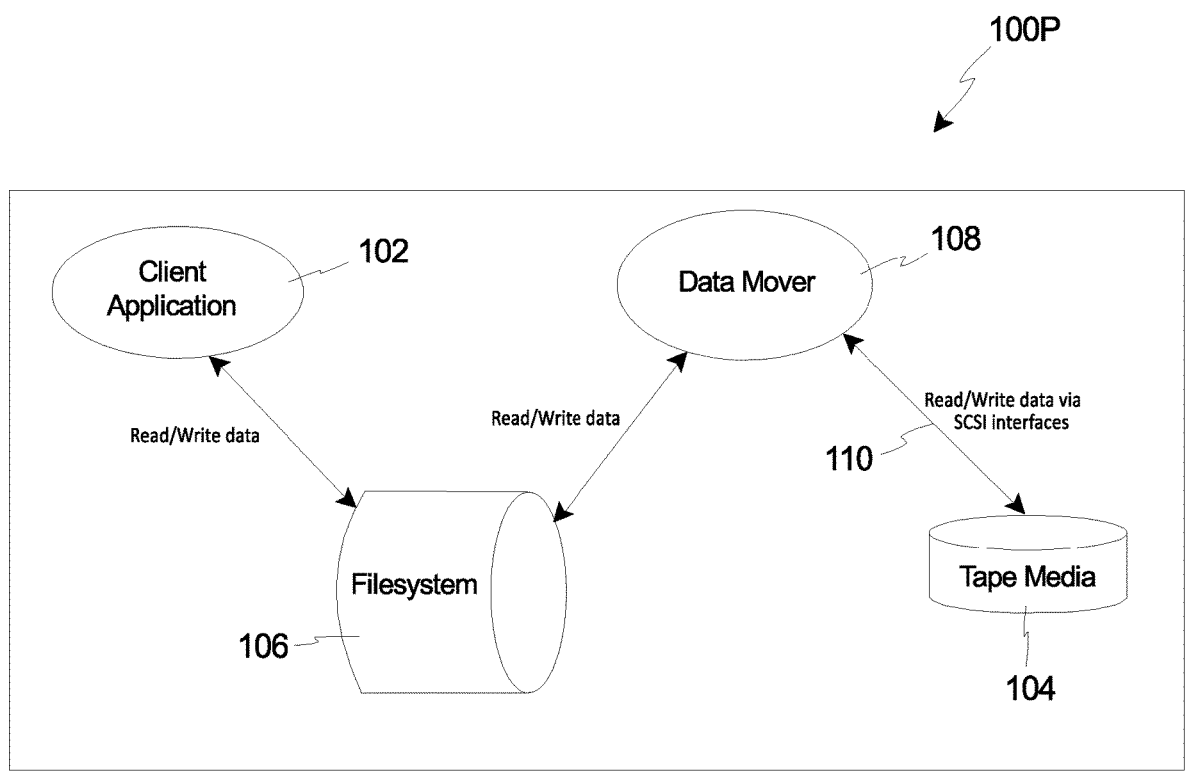
FIG. 1 is a simplified flowchart illustrating a prior art system where the client application writes data to tape media and reads data from tape media going directly through a filesystem and a data mover using a SCSI interface.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a system and method for writing data to tape media and reading data from tape media using a Representational State Transfer (REST) interface, also sometimes referred to as a RESTful interface. More specifically, the present invention enables a client application to merely make REST calls to a REST daemon for requesting that data be written to or read from tape media, while bypassing a filesystem that uses SCSI logic to write such data. This proposal is novel in that the currently provided interfaces to tape employ direct use of a SCSI interface which can be complex, and existing applications do not want to have to write such complex code to read from and write to tape media. The present invention removes that complexity and makes it much easier to read from and write to tape through use of a very simplified RESTful interface, which can be integrated with a SCSI interface, but where the SCSI interface is hidden or otherwise obscured from the perspective of the client application.

As utilized herein, a "daemon" is generally defined as a background process that handles requests for services such as print spooling and file transfers, and is dormant when not required.

Within the present invention, by creating a couple of RESTful interfaces that hide any complex SCSI-based interactions, the REST client can just make a RESTful call to read data from or write data to tapes. Using a RESTful interface simplifies things and keeps the application from having to know about the underlying SCSI tape drive and tape library interfaces being used. Thus, taking advantage of the RESTful interface allows a client application to write to tape or read from tape very easily.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
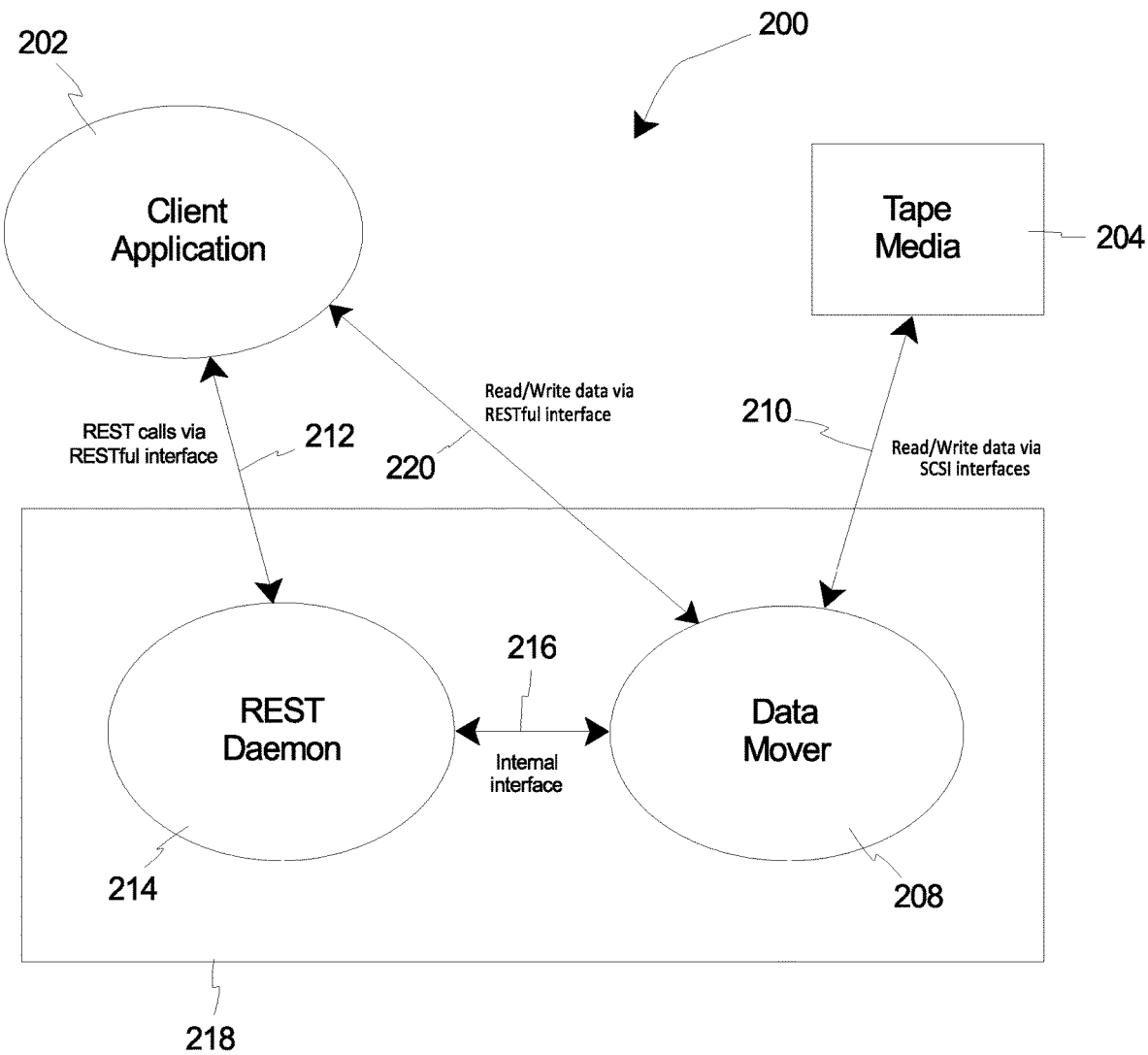
FIG. 2 is a simplified flowchart illustrating a system having features of the present invention that enables a client application to write data to tape media and read data from tape media using a RESTful interface.

FIG. 2 is a simplified flowchart illustrating a RESTful system 200 (also sometimes referred to herein simply as a "system") having features of the present invention that enables a client application 202 to write data to tape media 204 and read data from tape media 204 using a RESTful interface 212.

An application programming interface (API or web API) is a set of definitions and protocols for building and integrating application software. It is sometimes referred to as a contract between an information provider and an information user, thereby establishing the content required from the consumer (the call) and the content required by the producer (the response). In other words, if one wants to interact with a computer or system to retrieve information or perform a function, an API helps them communicate what they want to that system so it can understand and fulfill the request. It is also a way for an organization to share resources and information while maintaining security, control, and authentication, thus determining who gets access to what. Another advantage of an API is that one doesn't have to know the specifics of caching, such as how your resource is retrieved or where it comes from.

Representational state transfer (REST) is a software architectural style that was created to guide the design and development of the architecture for the World Wide Web. REST is not a protocol or a standard, but rather defines a set of constraints for how the architecture of an Internet-scale distributed hypermedia system, such as the Web, should behave. The REST architectural style emphasizes the scalability of interactions between components, uniform interfaces, independent deployment of components, and the creation of a layered architecture to facilitate caching components to reduce user-perceived latency, enforce security, and encapsulate legacy systems.

REST has been employed throughout the software industry and is a widely accepted set of guidelines for creating stateless, reliable web APIs. A REST API (also known as RESTful API or RESTful interface) is an API or web API that conforms to the constraints of REST architectural style and allows for interaction with RESTful web services. RESTful APIs are typically loosely based on HTTP methods to access resources via URL-encoded parameters and the use of JSON or XML to transmit data.

API developers can implement REST in a variety of ways. When a client request is made via a RESTful interface, it transfers a representation of the state of the resource to the requester or endpoint. This information, or representation, is delivered in one of several formats via HTTP, such as JSON, HTML, XLT, Python, PHP, or plain text. JSON is the most generally popular file format to use because, despite its name, it is language-agnostic, as well as being readable by both humans and machines.

Headers and parameters are also important in the HTTP methods of a RESTful interface HTTP request, as they contain important identifier information as to the request's metadata, authorization, uniform resource identifier (URI), caching, cookies, and more. There are request headers and response headers, each with their own HTTP connection information and status codes.

In various implementations, in order for an API to be considered RESTful, the API must necessarily include:
1) A client-server architecture made up of clients, servers, and resources, with requests managed through HTTP;
2) Stateless client-server communication, meaning no client information is stored between get requests and each request is separate and unconnected;
3) Cacheable data that streamlines client-server interactions;
4) A uniform interface between components so that information is transferred in a standard form. This requires that (a) resources requested are identifiable and separate from the representations sent to the client; (b) resources can be manipulated by the client via the representation they receive because the representation contains enough information to do so; (c) self-descriptive messages returned to the client have enough information to describe how the client should process it; and (d) hypertext/hypermedia is available, meaning that after accessing a resource the client should be able to use hyperlinks to find all other currently available actions they can take; and
5) A layered system that organizes each type of server (those responsible for security, load-balancing, etc.) involves the retrieval of requested information into hierarchies, but is invisible to the client.

Optionally, in certain implementations, the API can further include Code-on-demand, which encompasses the ability to send executable code from the server to the client when requested, extending client functionality.

Though the REST API has these criteria to conform to, it is still considered easier than other interfaces, as REST is merely a set of guidelines that can be implemented as needed, making REST APIs faster and more lightweight, with increased scalability.

As illustrated in FIG. 2, in using the RESTful system 200, the client application 202 initiates input/output (I/O) operations by making one or more REST calls with a REST daemon 214 via the RESTful interface 212. Stated in another manner, the REST calls from the client application 202 to the REST daemon 214 are used to initiate and/or set-up operations. As such, the RESTful interface 212 functions as an implementation for passing the requested I/O operations to the REST daemon 214. The REST daemon 214 is configured to provide the necessary mechanisms to listen and react to the I/O operations specified via the RESTful interface 212. More particularly, the REST daemon 214 is exposed to the client application 202 so they know how to communicate with it.

In various implementations, the present invention can be achieved, at least in part, through modifications and/or code changes made to existing software in the RESTful system 200. For example, the RESTful system 200 necessarily defines the RESTful interface 212 that would be useful to outside parties. In one implementation, the REST daemon 214 was added to the RESTful system 200 as a new software daemon to receive and respond to the RESTful interface 212, and which would effectively understand and receive REST communications from the outside. This encompasses an improvement over conventional systems which are not designed to enable such integration with existing system software. Thus, the components and modifications incorporated within the RESTful system 200 having features of the present invention allows an outside entity to be able to access tape using a common RESTful interface 212, and avoids having to implement a complex SCSI interface as well as a complex tape subsystem such as are typically required within conventional systems.

In some implementations, the client application 202 can initiate a write request via a REST call to the REST daemon 214 via the RESTful interface 212. Stated in another manner, the client application 202 can send a request to the REST daemon 214 to store some data to the tape media 204.

In other implementations, the client application 202 can initiate a read request via a REST call to the REST daemon 214 via the RESTful interface 212. Stated in another manner, the client application 202 can send a request to the REST daemon 214 to retrieve some data from the tape media 204.

In any implementations, the request can include information on how the data mover 208 can communicate with the client application 202. More particularly, the initial request from the client application 202 to the REST daemon 214 can include REST/URI authorization information which the data mover 208 can use to communicate back with the client application 202.

After the client application 202 sends the initial request to the REST daemon 214, the REST daemon 214 then passes the request on to the data mover 208. For example, in some embodiments, as shown, the RESTful system 200 can also include an internal interface 216 that manages any direct communication between the REST daemon 214 and the data mover 208.

As illustrated in FIG. 2, in certain non-exclusive embodiments, the REST daemon 214 and/or the data mover 208 can be retained within and/or included as part of a storage management system 218.

The data mover 208 then opens an interface to the client application 202 and an interface to the tape drive (not shown) and/or the tape media 204. In many embodiments, the interface between the data mover 208 and the client application 202 is in the form of a second RESTful interface 220. More specifically, based on the REST/URI authorization information received as part of the initial request from the client application 202 to the REST daemon 214, the data mover 208 subsequently uses such REST/URI authorization information from the request to communicate with the client application 202.

The client application 202 will then send/receive data via requests to write and/or read data directly to the data mover 208 (all in memory). Stated in another manner, after the REST daemon 214 is exposed to the client application 202 so they know how to communicate with it, and the REST daemon 214 communicates as necessary with the data mover 208, the client application 202 then pass in URL's for the data mover 208 to communicate back on. In this way, the data mover 208 cannot be contacted directly by the client application 202 without the data mover 208 having first opened the interface, such as the second RESTful interface 220, to the client application 202.

For a write request, the data mover 208 will read data from the client application 202, and then write such data to the tape media 204 via SCSI interface 210. Conversely, for a read request, the data mover 208 will read data from the tape media 204 via the SCSI interface 210, and then send such data back to the client application 202. Simply stated, in such implementations, the data mover 208 then writes data to tape media 204 and/or reads data from tape media 204 via the SCSI interface 210. As such, the data mover 208 functions as a daemon whose purpose is to move data from a first point (point "A") to a second point (point "B"). For a write request implementation, point A would be the client application 202 that performs the I/O via the REST calls made through the RESTful interface 212 to the REST daemon 214; and Point B would be the tape media 204 on which the data mover 208 performs I/O operations using the SCSI interface 210. Conversely, for a read request implementation, point A would be the tape media 204 on which the data mover 208 performs I/O operations using the SCSI interface 210; and point B would be the client application 202 that performs the I/O via the REST calls made through the RESTful interface 212 to the REST daemon 214.

In the RESTful system 200 as described, the client's data never lands on primary storage, such as a disk or filesystem. Rather, the client's data merely travels from the client application 202 to the tape media 204 via the data mover 208. Conversely, in the typical prior art system 100P (the "SCSI system"), as shown in FIG. 1, the client's data lands on primary storage such as the disk or file system 106 during transmission between the client application 102 and the data mover 108.

In general, the interface (the RESTful interface 212) between the client application 202 and the REST daemon 214 is a control path, and the interface between the client application 202 and the data mover 208 is the data path.

In summary, in various embodiments, the present invention puts a RESTful interface 212 on top of the current processing required to take care of all of the media interactions. Stated in another manner, in many embodiments, the RESTful interface 212 is configured to sit on top of and/or be integrated into the SCSI system and/or with the SCSI interface 210. The unique design of the present invention enables the user to realize various benefits in comparison to a traditional SCSI system. For example, as described in detail herein above:

1) The RESTful system 200 allows for the client application 202, through a RESTful interface 212, to read, restore and/or retrieve data from tape media 204. In particular, the client application 202 will make a restore request and the underlying logic will mount the tape, position to the correct location on tape, read the data off of the tape, and return it through the RESTful interface 212 back to the calling client application 202; and 2) The RESTful system 200 allows for the client application 202, through a RESTful interface 212, to write and/or archive data to the tape media 204. In particular, the client application 202 will make a store request and the underlying logic will mount the tape, position to the correct location on tape, and write the data to tape that is coming through the RESTful interface 212.

In addition to the functional interfaces noted above, in certain implementations, the present invention can also be implemented with various alternative functional interfaces through the RESTful interface 212 within the RESTful system 200. For example, in addition to reading/restoring data from tape and writing/archiving data to tape, as noted above, key interfaces that can be provided through the RESTful interface 212 can include, but are not limited to: (i) Cleaning up tape; (ii) Adding/removing a policy class; (iii) Getting request information (in progress, queued, completed); (iv) Getting tape drive information; (v) Getting tape information; (vi) Updating drive state; (vii) Updating media state; (viii) Cancelling a request; (ix) Backing up filesystem data; and (x) Copying backup files.

As an overview, as described in detail herein, the present invention provides a software solution to overcome issues of complexity for writing data to tape and reading data from tape that are present in conventional systems. To utilize such software innovation requires a file system to run the software, such as a Linux computer system in one non-exclusive embodiment, and a tape library and associated items that are further required for purposes of writing the data to tape. Thus, the present invention improves computer functionality and operation by allowing for other entities to access tape devices without having to understand and implement SCSI interfaces. Simply stated, the RESTful interface incorporated within the present invention is a much simpler solution for the user who desires to write data to tape and/or read data from tape.

It is understood that although a number of different embodiments of the system 200 have been illustrated and described herein, one or more features of any one embodiment can be combined with one or more features of one or more of the other embodiments, provided that such combination satisfies the intent of the present invention.

While a number of exemplary aspects and embodiments of the system 200 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A system for at least one of writing data to tape media and reading data from the tape media, the system comprising:
   a client application; and
   a RESTful interface through which the client application transmits a request to at least one of write data to the tape media and read data from the tape media to a REST daemon, wherein:
   the REST daemon subsequently passes the request on to a data mover; and
   the data mover subsequently opens an interface with the client application.

2. The system of claim 1 wherein the client application initiates a first request to write data to the tape media via a REST call to the REST daemon via the RESTful interface; and wherein the client application initiates a second request to read data from the tape media via a REST call to the REST daemon via the RESTful interface.

3. The system of claim 1 wherein the REST daemon passes the request on to the data mover via an internal interface.

4. The system of claim 1 wherein at least one of the REST daemon and the data mover are included as part of a storage management system.

5. The system of claim 1 wherein the client application then sends the request to at least one of write data to the tape media and read data from the tape media to the data mover via the interface between the data mover and the client application.

6. The system of claim 5 wherein for a first request to write data to the tape media, the data mover reads the data from the client application, and then writes the data to the tape media via a SCSI interface; and wherein for a second request to read data from the tape media, the data mover reads the data from the tape media via the SCSI interface, and then sends the data to the client application.

7. The system of claim 1 wherein the interface between the data mover and the client application is a second RESTful interface.

8. The system of claim 1 wherein the data that is at least one of written to the tape media and read from the tape media never lands on primary storage during movement between the client application and the tape media.

9. The system of claim 1 wherein the RESTful interface is integrated with a SCSI interface.

10. A method for at least one of writing data to tape media and reading data from the tape media, the method comprising the step of:
    transmitting a request to at least one of write data to the tape media and read data from the tape media from a client application to a REST daemon via a RESTful interface:
        subsequently passing the request from the REST daemon to a data mover via an international interface; and
        subsequently opening an interface between the data mover and the client application.

11. The method of claim 10 wherein the step of transmitting includes (i) the client application initiating a first request to write data to the tape media via a REST call to the REST daemon via the RESTful interface, and (ii) the client application initiating a second request to read data from the tape media via a REST call to the REST daemon via the RESTful interface.

12. The method of claim 2, further comprising the step of the client application sending the request to at least one of write data to the tape media and read data from the tape media to the data mover via the interface between the data mover and the client application.

13. The method of claim 12 wherein for a first request to write data to the tape media, the method further comprises the steps of reading the data from the client application with the data mover, and writing the data to the tape media with the data mover via a SCSI interface; and wherein for a second request to read data from the tape media, the method further comprises the steps of reading the data from the tape media with the data mover via the SCSI interface, and sending the data to the client application with the data mover.

14. The method of claim 2 wherein the step of the client application sending the request to at least one of write data to the tape media and read data from the tape media to the data mover includes the interface between the data mover and the client application being a second RESTful interface.

15. The method of claim 10 wherein the data that is at least one of written to the tape media and read from the tape media never lands on primary storage during movement between the client application and the tape media.

16. The method of claim 10 wherein the step of transmitting includes the RESTful interface being integrated with a SCSI interface.

17. The method of claim 10 further comprising the step of the REST daemon subsequently passing the request on to a data mover.

18. The method of claim 10 further comprising the step of including one of the REST daemon and the data mover as part of a storage management system.

19. A system for at least one of writing data to tape media and reading data from the tape media, the system comprising:
    a client application; and
    a RESTful interface through which the client application transmits requests to write data to the tape media and read data from the tape media to a REST daemon;
    wherein the client application initiates a first request to write data to the tape media via a REST call to the REST daemon via the RESTful interface, the client application initiates a second request to read data from the tape media via a REST call to the REST daemon via the RESTful interface, the REST daemon subsequently passes the request on to a data mover via an internal interface, the data mover subsequently opens a second RESTful interface with the client application, the client application then sends the requests to write data to the tape media and read data from the tape media to the data mover via the second RESTful interface between the data mover and the client application, for the first request to write data to the tape media, the data mover reads the data from the client application, and then writes the data to the tape media via a SCSI interface, for the second request to read data from the tape media, the data mover reads the data from the tape media via the SCSI interface, and then sends the data to the client application, the data that is written to the tape media and read from the tape media never lands on primary storage during movement between the client application and the tape media; and the RESTful interface is integrated with a SCSI interface.

* * * * *

UNITED STATES PATENT AND TRADEMARK OFFICE
CERTIFICATE OF CORRECTION

PATENT NO. : 11,961,541 B2
APPLICATION NO. : 18/107246
DATED : April 16, 2024
INVENTOR(S) : Jeff Leuschner et al.

It is certified that error appears in the above-identified patent and that said Letters Patent is hereby corrected as shown below:

In the Claims

Column 9, Claim 10, Line 27, delete "step" and insert -- steps --

Column 9, Claim 10, Line 31, delete "interface:" and insert -- interface; --

Column 9, Claim 10, Line 33, delete "international" and insert -- internal --

Column 9, Claim 12, Line 44, delete "2" and insert -- 10 --

Column 10, Claim 14, Line 5, delete "2" and insert -- 10 --

Signed and Sealed this
Twenty-first Day of May, 2024

*Katherine Kelly Vidal*

Katherine Kelly Vidal
*Director of the United States Patent and Trademark Office*